US012756040B2

(12) United States Patent
Choi et al.

(10) Patent No.: US 12,756,040 B2
(45) Date of Patent: Oct. 6, 2026

(54) POUCH FILM LAMINATE AND SECONDARY BATTERY

(71) Applicant: LG Energy Solution, Ltd., Seoul (KR)

(72) Inventors: Ji Eun Choi, Daejeon (KR); Sang Hun Kim, Daejeon (KR); Gyung Soo Kang, Daejeon (KR); Hyung Kyun Yu, Daejeon (KR); Jae Ho Lee, Daejeon (KR); Ji Sun Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 167 days.

(21) Appl. No.: 18/530,928

(22) Filed: Dec. 6, 2023

(65) Prior Publication Data

US 2024/0213588 A1 Jun. 27, 2024

(30) Foreign Application Priority Data

Dec. 22, 2022 (KR) ........................ 10-2022-0182363

(51) Int. Cl.
*H01M 50/126* (2021.01)
*H01M 50/105* (2021.01)
(Continued)

(52) U.S. Cl.
CPC ....... *H01M 50/126* (2021.01); *H01M 50/105* (2021.01); *H01M 50/119* (2021.01); *H01M 50/121* (2021.01); *H01M 50/133* (2021.01)

(58) Field of Classification Search
CPC ............. H01M 50/105; H01M 50/126; H01M 50/119; H01M 50/121; H01M 50/124; H01M 50/133; H01M 50/10; H01M 50/116; H01M 10/052; B21B 1/22; B21B 1/38; B21B 1/40; B32B 15/08; B32B 15/085; B32B 15/088; B32B 15/09; B32B 15/18; B32B 2250/02; B32B 2250/03; B32B 2250/40; B32B 2255/06; B32B 2255/205;
(Continued)

(56) References Cited

U.S. PATENT DOCUMENTS

2016/0365545 A1 12/2016 Takahagi et al.
2017/0009312 A1* 1/2017 Unno .................. C21D 8/0273
(Continued)

FOREIGN PATENT DOCUMENTS

CN 107968160 A 4/2018
EP 1981101 A1 10/2008
(Continued)

OTHER PUBLICATIONS

International Search Report for Application No. PCT/KR2023/019729 mailed Mar. 11, 2024. 3 pgs.
(Continued)

*Primary Examiner* — Stewart A Fraser
*Assistant Examiner* — Lilia Nedialkova
(74) *Attorney, Agent, or Firm* — Lerner David LLP

(57) ABSTRACT

Disclosed herein is a pouch film having a base material layer, a gas barrier layer, and a sealant layer. The gas barrier layer may include stainless steel and may be disposed between the base material layer and the sealant layer. A difference between a rupture energy measured along a machine direction (MD) of the gas barrier layer and a rupture energy measured along a transverse direction (TD) of the gas barrier layer may be less or equal to 2000 J.

16 Claims, 3 Drawing Sheets

(51) Int. Cl.
*H01M 50/119* (2021.01)
*H01M 50/121* (2021.01)
*H01M 50/133* (2021.01)

(58) Field of Classification Search
CPC ........ B32B 2307/704; B32B 2307/714; B32B 2307/732; B32B 2457/10; B32B 27/32; B32B 27/34; B32B 27/36; C21D 1/74; C21D 1/76; C21D 2201/05; C21D 2211/001; C21D 6/004; C21D 6/005; C21D 6/008; C21D 8/0205; C21D 8/0236; C21D 8/0268; C21D 8/0273; C21D 8/0405; C21D 8/0436; C21D 8/0447; C21D 8/0468; C21D 9/46; C21D 9/48; C22C 38/00; C22C 38/001; C22C 38/002; C22C 38/02; C22C 38/04; C22C 38/40; C22C 38/42; C22C 38/44; C22C 38/58; Y02E 60/10
See application file for complete search history.

(56) References Cited

U.S. PATENT DOCUMENTS

| | | | | |
|---|---|---|---|---|
| 2017/0162836 | A1* | 6/2017 | Ibaragi | H01G 9/08 |
| 2017/0256758 | A1 | 9/2017 | Kawakita | |
| 2018/0019502 | A1* | 1/2018 | Iizuka | H01M 50/121 |
| 2018/0237882 | A1* | 8/2018 | Unno | B21B 1/22 |
| 2018/0282834 | A1* | 10/2018 | Unno | C21D 8/0273 |
| 2023/0374348 | A1 | 11/2023 | Tamari et al. | |

FOREIGN PATENT DOCUMENTS

| | | | |
|---|---|---|---|
| JP | 2003145278 | A | 5/2003 |
| JP | 2010209449 | A | 9/2010 |
| JP | 5266628 | B2 | 8/2013 |
| JP | 2016062805 | A | 4/2016 |
| JP | 5966611 | B2 | 8/2016 |
| JP | 2017126565 | A | 7/2017 |
| JP | 2018015986 | A | 2/2018 |
| JP | 2018060674 | A | 4/2018 |
| JP | 2018176494 | A | 11/2018 |
| JP | 6690800 | B1 | 4/2020 |
| JP | 2020157593 | A | 10/2020 |
| JP | 2021190419 | A | 12/2021 |
| JP | 2022-000854 | A | 1/2022 |
| JP | 2022095541 | A | 6/2022 |
| KR | 2016-0120312 | A | 10/2016 |
| KR | 20170102813 | A | 9/2017 |
| KR | 2021-0068073 | A | 6/2021 |
| KR | 102391823 | B1 | 4/2022 |
| KR | 102414195 | B1 | 6/2022 |
| WO | 2022075259 | A1 | 4/2022 |

OTHER PUBLICATIONS

Written Opinion for Application No. PCT/KR2023/019729 mailed Mar. 11, 2024. 3 pgs.

Extended European Search Report including Written Opinion for Application No. 23907500.5 dated Jan. 27, 2026. 8 pgs.

Japanese Industrial Standards (JIS). JIS G 4305:2012. "Cold-rolled stainless steel plate, sheet and strip." Available at: https://kikakurui.com/g4/G4305-2015-01.html. Retrieved Apr. 18, 2025. English Abstract. 34 pgs.

Third Party Observation for Application No. PCT/KR2023/019729 dated Apr. 23, 2025. 4 pgs.

* cited by examiner

[FIG. 1]
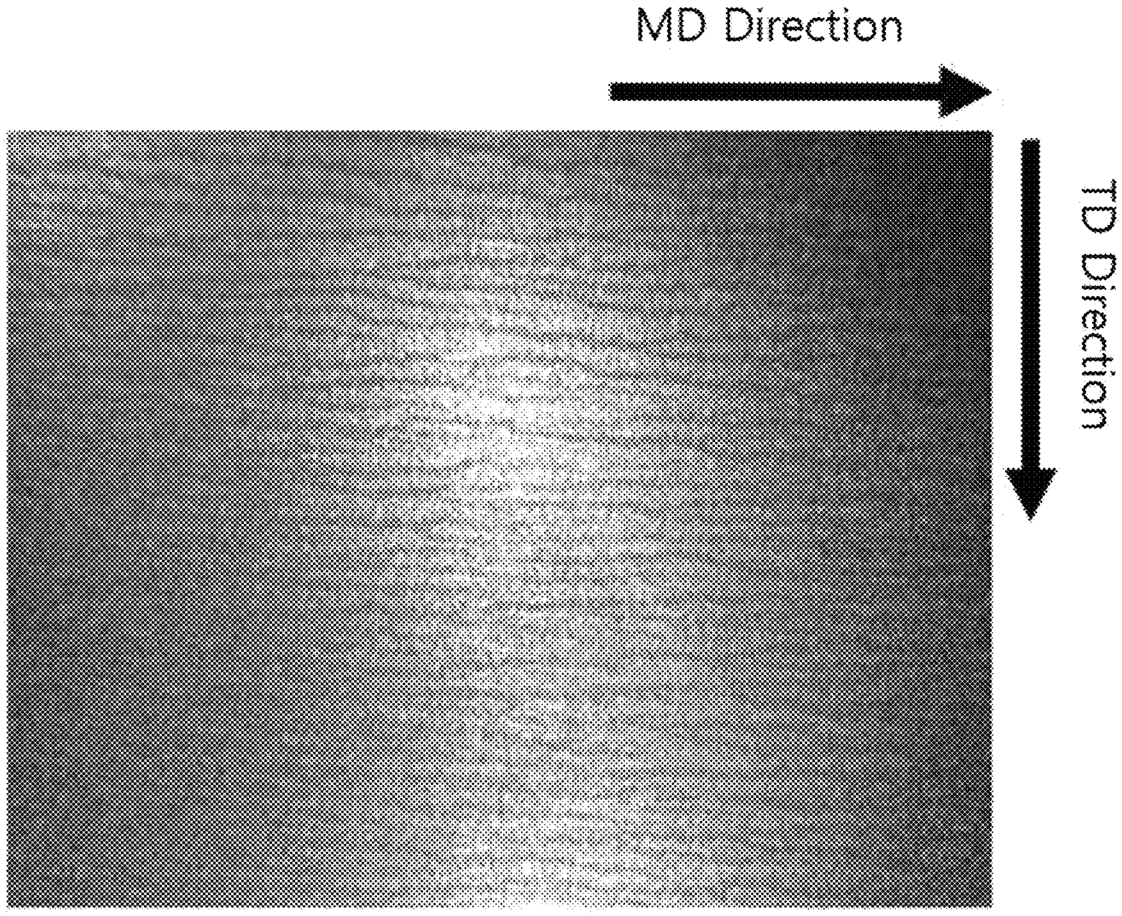

[FIG. 2]
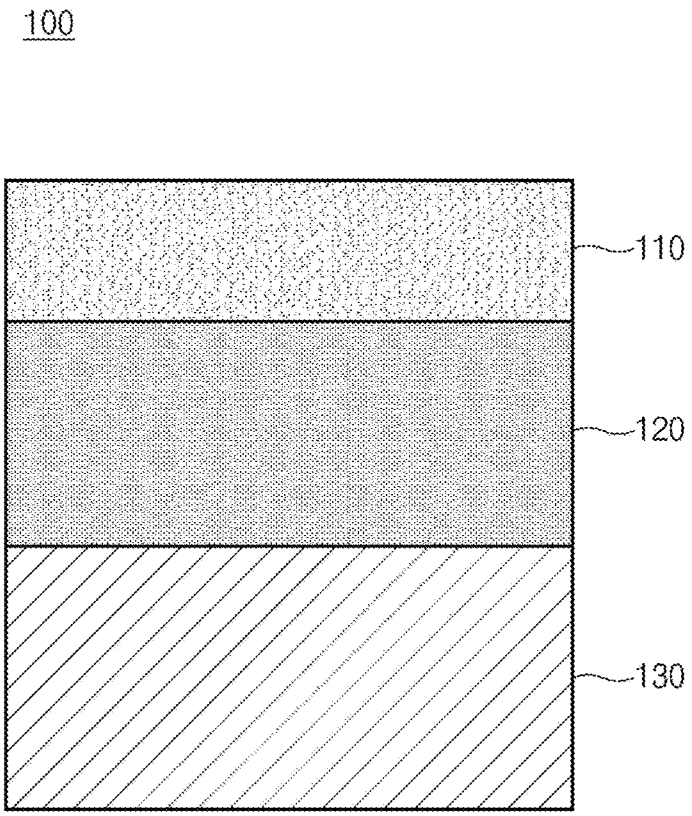

[FIG. 3]
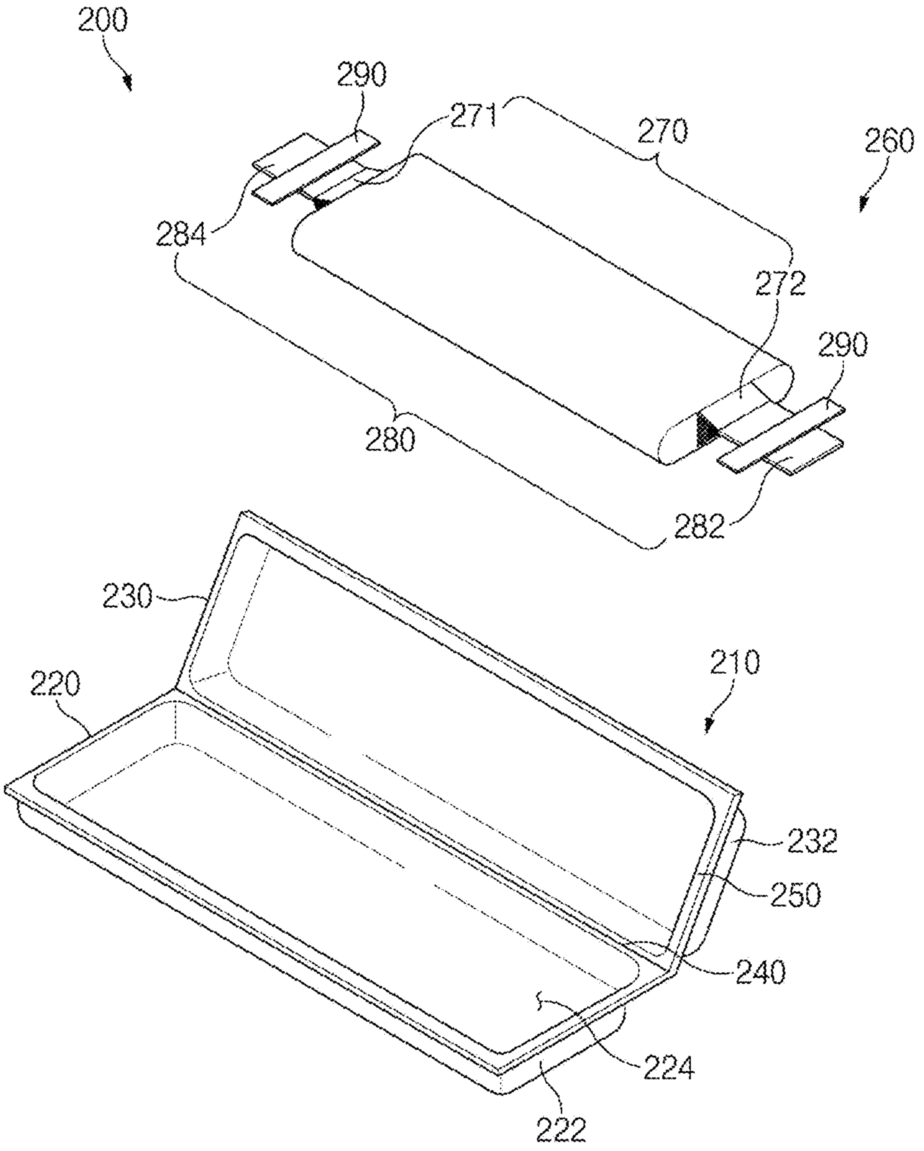

POUCH FILM LAMINATE AND SECONDARY BATTERY

CROSS-REFERENCE TO RELATED APPLICATIONS

This application claims the priority of Korean Patent Application No. 10-2022-0182363 filed on Dec. 22, 2022, in the Korean Intellectual Property Office, the disclosure of which is incorporated herein by reference in its entirety.

FIELD OF INVENTION

The present disclosure relates to a pouch film laminate and a secondary battery manufactured by molding the same.

BACKGROUND OF THE INVENTION

In general, secondary batteries include nickel-cadmium batteries, nickel-hydrogen batteries, lithium ion batteries, and lithium ion polymer batteries. Such a secondary battery is being applied to be used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the secondary battery, first, electrode active material slurry is applied to a positive electrode current collector and a negative electrode current collector to manufacture a positive electrode and a negative electrode. Then, the electrodes are stacked on both sides of a separator to form an electrode assembly. Also, the electrode assembly is accommodated in a battery case, and then the battery case is sealed after an electrolyte is injected therein.

Such a secondary battery is classified as a pouch-type secondary battery or a can-type secondary battery according to a material of a case accommodating the electrode assembly. In the pouch type, an electrode assembly is accommodated in a pouch made from a stack of a polymer and a metal thin film. In the can-type secondary battery, an electrode assembly is accommodated in a case made of a metal or plastic material.

A pouch, which is a case of the pouch-type secondary battery, is manufactured by forming a cup part by performing press processing on a pouch film laminate having flexibility. When the cup part is formed, a secondary battery may be manufactured by accommodating the electrode assembly in the inner accommodating space of the cup part and sealing the sealing part.

In general, a pouch film laminate is formed as a plurality of layers in which a base material layer is stacked on one surface of a gas barrier layer made of a metal, and a sealant layer is stacked on the other surface. In the case of an aluminum pouch in which aluminum is applied to the gas barrier layer, the aluminum pouch has an advantage of securing mechanical strength having a predetermined level or more, being lightweight, and securing complementary and heat dissipation properties for the electrochemical properties of an electrode assembly and an electrolyte. However, the aluminum pouch has a limitation in that the pouch may be melted or deformed when an internal pressure and temperature of the cell increase due to fire or the like.

To prevent this limitation, a technique for preventing deformation due to a high temperature and high pressure has been developed by applying a high-strength material such as stainless steel instead of aluminum to the gas barrier layer. However, since the pouch film laminate using the high-strength material as the gas barrier layer has poor moldability, it is not possible to secure a sufficient forming depth when forming the cup part. In some cases, there is a limitation in that the pouch film laminate is ruptured. Here, when the forming depth of the pouch film laminate is not secured, since the number of electrode assemblies accommodated therein is limited, it is difficult to improve cell energy density.

Thus, it is necessary to develop a pouch film having sufficient forming depth while securing durability under high temperature and high pressure conditions.

BRIEF SUMMARY

An aspect of the present disclosure provides a pouch film laminate capable of improving moldability and a high-strength pouch-type secondary battery.

According to an aspect of the present disclosure, there is provided a pouch film laminate including a base material layer, a gas barrier layer, and a sealant layer, which may be sequentially stacked. The gas barrier layer may include stainless steel. A difference in rupture energy according to Equation 1 below may be about 2,000 J or less.

$$\text{Rupture energy difference } (J) = |\text{rupture energy } (J) \text{ in } MD \text{ direction of gas barrier layer} - \text{rupture energy } (J) \text{ in } TD \text{ direction of gas barrier layer}| \quad \text{[Equation 1]}$$

Continuing in accordance with this aspect, the rupture energy of the gas barrier layer in the MD direction may be about 5,000 J or more, and rupture energy of the gas barrier layer in the TD direction may be about 5,000 J or more.

Continuing in accordance with this aspect, a difference in a tensile rupture elongation according to Equation 2 below may be about 10% or less.

$$\text{Tensile rupture elongation difference } (\%) = |\text{Tensile rupture elongation } (\%) \text{ in } MD \text{ direction of gas barrier layer} - \text{tensile rupture elongation } (\%) \text{ in } TD \text{ direction of gas barrier layer}| \quad \text{[Equation 2]}$$

Continuing in accordance with this aspect, a tensile rupture elongation of the gas barrier layer in the MD direction may be about 15% or more, and a tensile rupture elongation of the gas barrier layer in the TD direction may be about 15% or more.

Continuing in accordance with this aspect, a difference in tensile rupture strength according to Equation 3 below may be about 150 MPa or less.

$$\text{Tensile rupture strength difference (MPa)} = |\text{Tensile rupture strength (MPa) in } MD \text{ direction of gas barrier layer} - \text{tensile rupture strength (MPa) in } TD \text{ direction of gas barrier layer}| \quad \text{[Equation 3]}$$

Continuing in accordance with this aspect, a tensile rupture strength of the gas barrier layer in the MD direction may be about 400 MPa or more, and a tensile rupture strength of the gas barrier layer in the TD direction may be about 400 MPa or more.

Continuing in accordance with this aspect, the gas barrier layer may have a thickness of about 30 μm to about 100 μm.

Continuing in accordance with this aspect, a percentage $R_t$ of a thickness of the gas barrier layer relative to a thickness of the pouch film laminate, which may be calculated by Equation 4 below, may be about 10% to about 50%.

$$R_t\,(\%) = (\text{thickness of gas barrier layer/thickness of pouch film laminate}) \times 100 \qquad \text{[Equation 4]}$$

Continuing in accordance with this aspect, the pouch film laminate may have a thickness of about 80 μm to about 300 μm.

According to another aspect of the present disclosure, there is provided a pouch-type secondary battery including a pouch-type battery case in which an electrode assembly may be accommodated. The pouch-type secondary battery may include a pouch film laminate. The pouch film laminate may include a base material layer, a gas barrier layer, and a sealant layer, which may be sequentially stacked. The gas barrier layer may include stainless steel. A difference in a rupture energy according to Equation 1 below is about 2,000 J or less.

In accordance with an aspect of the present disclosure, a pouch film laminate is provided. A pouch film laminate according to this aspect may include a base material layer, a gas barrier layer, and a sealant layer. The gas barrier layer may include stainless steel and may be disposed between the base material layer and the sealant layer. A difference between a rupture energy measured along a machine direction (MD) of the gas barrier layer and a rupture energy measured along a transverse direction (TD) of the gas barrier layer may be less than or equal 2000 J. The machine direction may extend parallel to a rolling direction during manufacture of the gas barrier layer and the transverse direction may be transverse to the machine direction.

Continuing in accordance with this aspect, the rupture energy of the gas barrier layer in the machine direction may be about 5,000 J or more, and the rupture energy of the gas barrier layer in the transverse direction may be about 5,000 J or more.

Continuing in accordance with this aspect, a difference between a tensile rupture elongation along the machine direction of the gas barrier layer and a tensile rupture elongation along the transverse direction of the gas barrier layer may be about 10% or less.

Continuing in accordance with this aspect, a tensile rupture elongation length of the gas barrier layer in the machine direction may be about 15% or more than an original length of the gas barrier layer in the machine direction, and a tensile rupture elongation length of the gas barrier layer in the transverse direction may be about 15% or more than an original length of the gas barrier layer in the transverse direction.

Continuing in accordance with this aspect, a difference between a tensile rupture strength of the gas barrier layer in the machine direction and a tensile rupture strength of the gas barrier layer in the transverse direction of the gas barrier layer may be about 150 MPa or less.

Continuing in accordance with this aspect, a tensile rupture strength of the gas barrier layer in the machine direction may be about 400 MPa or more, and a tensile rupture strength of the gas barrier layer in the transverse direction may be about 400 MPa or more.

Continuing in accordance with this aspect, a thickness of the gas barrier layer may be about 10% to 50% of a thickness of the pouch film laminate.

Continuing in accordance with this aspect, the gas barrier layer may have a thickness of about 30 μm to about 100 μm.

Continuing in accordance with this aspect, the pouch film laminate may have a thickness of about 80 μm to about 300 μm.

In accordance with another aspect of the present disclosure, a pouch-type secondary battery is provided. A pouch-type secondary battery according to this aspect may include a pouch-type battery case in which an electrode assembly may be accommodated. The pouch-type secondary battery may include a pouch film laminate. The pouch film laminate may have a base material layer, a gas barrier layer, and a sealant layer. The gas barrier layer may include stainless steel and may be disposed between the base material layer and the sealant layer. A difference between a rupture energy measured along a machine direction (MD) of the gas barrier layer and a rupture energy measured along a transverse direction (TD) of gas barrier layer may be less than or equal 2000 J. The machine direction may extend parallel to a rolling direction during manufacture of the gas barrier layer and the transverse direction may be transverse to the machine direction.

Continuing in accordance with this aspect, the rupture energy of the gas barrier layer in the machine direction may be about 5,000 J or more, and the rupture energy of the gas barrier layer in the transverse direction may be about 5,000 J or more.

Continuing in accordance with aspect, a this difference between a tensile rupture elongation along the machine direction of the gas barrier layer and a tensile rupture elongation along the transverse direction of the gas barrier layer may be about 10% or less.

Continuing in accordance with this aspect, a tensile rupture elongation length of the gas barrier layer in the machine direction may be about 15% or more than an original length of the gas barrier layer in the machine direction, and a tensile rupture elongation length of the gas barrier layer in the transverse direction may be about 15% or more than an original length of the gas barrier layer in the transverse direction.

Continuing in accordance with this aspect, a difference between a tensile rupture strength of the gas barrier layer in the machine direction and a tensile rupture strength of the gas barrier layer in the transverse direction of the gas barrier layer may be about 150 MPa or less.

Continuing in accordance with this aspect, a tensile rupture strength of the gas barrier layer in the machine direction may be about 400 MPa or more, and a tensile rupture strength of the gas barrier layer in the transverse direction may be about 400 MPa or more.

Continuing in accordance with this aspect, a thickness of the gas barrier layer may be about 10% to 50% of a thickness of the pouch film laminate.

Continuing in accordance with this aspect, the gas barrier layer may have a thickness of about 30 μm to about 100 μm.

In accordance with another aspect of the present disclosure, a method for manufacturing a pouch-type secondary battery is provided. A method according to this aspect may include the steps of providing a pouch film laminate with a base material layer, a gas barrier layer and a sealant layer, the gas barrier layer may be disposed between the base material layer and the sealant layer; measuring a first rupture energy of the gas barrier layer along a first direction of the gas barrier layer; measuring a second rupture energy of the gas barrier layer along a second direction of the gas barrier layer, the second direction may be transverse to the first direction; determining that a difference between the first rupture energy and the second rupture energy is less than a predetermined threshold, and shaping the pouch film laminate to accommodate a secondary battery to form a pouch-type secondary battery.

Continuing in accordance with this aspect, the predetermined threshold may be about 2000 J or less.

Continuing in accordance with this aspect, the first direction may be a machine direction extending parallel to a rolling direction during manufacture of the gas barrier layer.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a photo image of a gas barrier layer illustrating a MD direction and a TD direction of the gas barrier layer.

FIG. 2 is a cross-sectional view of a pouch film laminate according to an embodiment of the present disclosure.

FIG. 3 is an exploded view of a pouch-type secondary battery according to an embodiment of the present disclosure.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

Unless terms used in the present disclosure are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present disclosure. In this specification, the terms of a singular form may comprise plural forms unless specifically mentioned. The meaning of "includes (comprises)" and/or "including (comprising)" does not exclude other components besides a mentioned component.

In this specification, a base material of "A and/or B" means a base material of A or B, or a mixture of A and B.

In this specification, reference symbol "%" means % by weight unless explicitly indicated otherwise.

In the present specification, a machine direction (MD) means a direction parallel to a rolling direction when manufacturing a thin film for forming a gas barrier layer, and a transverse direction (TD) means a direction perpendicular to the rolling direction when manufacturing the thin film for forming the gas barrier layer. For example, as shown in FIG. 1, the MD direction and TD direction of the gas barrier layer can be confirmed with the naked eye through patterns formed on the surface of the gas barrier layer. A veining pattern extending along the MD direction and transverse to the TD direction is shown in FIG. 1.

In the present specification, rupture energy may mean the total energy required until a specimen is ruptured—i.e., specimen fractures into two or more separate portions, when the specimen is pulled in one direction and may correspond to an area of a stress-strain curve. The rupture energy may be measured by cutting a specimen to a width of about 15 mm and a length of about 100 mm. Both ends of the specimen in lengthwise direction are then coupled to upper/lower jigs of a UTM. The gap between the end of the part fastened to the upper jig and the end of the part fastened to the lower jig of the UTM may be 50 mm. The specimen is then pulled in a direction of about 180° at a speed of about 5 mm/min at room temperature (about 25° C.) to perform a tensile test.

In the present specification, tensile rupture elongation means a percentage (%) of a length extending until the specimen is ruptured (tensile rupture elongation length) compared to an initial length of the specimen when the specimen is pulled in one direction. The tensile rupture elongation may be measured by cutting a specimen to a width of about 15 mm and a length of about 100 mm. Both ends of the specimen in a lengthwise direction are then coupled to upper/lower jigs of a UTM. The gap between the end of the part fastened to the upper jig and the end of the part fastened to the lower jig of the UTM may be 50 mm. A tensile test is then conducted by pulling the specimen in a direction of about 180° at a speed of about 5 mm/min at room temperature (about 25° C.).

In the present specification, tensile rupture strength means a value obtained by dividing a maximum load applied until the specimen is ruptured by a cross-sectional area of the specimen before tension when the specimen is pulled in one direction. The tensile rupture strength may be measured by cutting a specimen to a width of about 15 mm and a length of about 100 mm. Both ends of the specimen in a lengthwise direction are then coupled to upper/lower jigs of a UTM. The gap between the end of the part fastened to the upper jig and the end of the part fastened to the lower jig of the UTM may be 50 mm. A tensile test is then conducted by pulling the specimen in a direction of about 180° at a speed of about 5 mm/min at room temperature (about 25° C.).

Pouch Film Laminate

The pouch film laminate according to the present disclosure includes a base material layer, a gas barrier layer, and a sealant layer, which are sequentially stacked. The gas barrier layer includes stainless steel. A difference in rupture energy as defined by Equation 1 below is about 2,000 J or less.

$$\text{Rupture energy difference } (J) = |\text{rupture energy } (J) \text{ in } MD \text{ direction of gas barrier layer} - \text{rupture energy } (J) \text{ in } TD \text{ direction of gas barrier layer}| \quad \text{[Equation 1]}$$

In using stainless steel, which is a high-strength material, as a component of a gas barrier layer, the present disclosure may solve a limitation of deterioration in moldability, which has been a limitation in the related art, by adjusting a difference in rupture energy in the MD and TD directions of the gas barrier layer to a specific range. According to the present disclosure, in spite of the use of stainless steel as the component of the gas barrier layer, the difference in fracture energy in the MD direction and the TD direction may be adjusted to a specific level or less to prevent the pouch film from rupturing or prevent a pinhole formation in a direction, in which the rupture energy is relatively low. As a result, the pouch film laminate of the present disclosure provides excellent durability and high moldability. Thus, a large number of electrode assemblies may be accommodated to implement a pouch-type secondary battery having excellent durability at a high temperature and a high pressure while improving a cell energy density.

FIG. 2 is a cross-sectional view of a pouch film laminate 100 according to the present disclosure. As illustrated in FIG. 2, a base material layer 110, a gas barrier layer 120, and a sealant layer 130 may be sequentially stacked in the pouch film laminate 100. Hereinafter, each configuration of the pouch film laminate of the present disclosure will be described in detail.

Base Material Layer

The base material layer 110 is formed at the outermost layer of the pouch film laminate 100 to protect a secondary battery from external friction and collision. The base material layer 110 may be made of a polymer to electrically insulate the electrode assembly from the outside.

The thickness of the base material layer 110 may be about 5 μm to about 100 μm, specifically about 7 μm to about 70 μm, and more specifically about 25 μm to about 60 μm. When the thickness of the base material layer 110 satisfies the above range, external insulation properties may be excellent, and since the entire pouch is not thick, a volume-to-energy density of the secondary battery may be excellent.

The base material layer 110 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The base material layer may be made of polyethylene terephthalate (PET), nylon, or a combination thereof having wear resistance and heat resistance. The base material layer may include polyethylene terephthalate; or polyethylene terephthalate and nylon.

The base material layer 110 may have a single film structure.

The base material layer 110 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The base material layer may include at least one of polyester-based films such as polyethylene terephthalate and polybutylene terephthalate having wear resistance and heat resistance, specifically polyethylene terephthalate, but is not limited thereto.

In the present disclosure, the pouch film laminate may further include an adhesive layer disposed between the base material layer 110 and the gas barrier layer 120 to be described later. The adhesive layer may be introduced for adhesion or attachment between the base material layer and the gas barrier layer, and an adhesive layer known in the art may be used without limitation.

That is, the base material layer 110 may have a composite layer structure which is constituted by layers that are respectively made of two or more materials.

Specifically, the base material layer 110 according to the present disclosure may include a first base material layer, a second base material layer and/or an adhesive layer. Here, the thickness of the base material layer 110 means the total thickness of the first base material layer, the second base material layer, and/or the adhesive layer. The first base material layer may be disposed at the outermost layer of the pouch film laminate, and the second base material layer may be disposed between the first base material layer and the gas barrier layer. The adhesive layer may be disposed between the first base material layer and the second base material layer or may be disposed between the second base material layer and the gas barrier layer. The first base material layer, the second base material layer, and the adhesive layer may be made of materials having different materials and/or physical properties, respectively. An interface may exist between the first base material layer, the second base material layer, and the adhesive layer. This means that the first base material layer, the second base material layer, and the adhesive layer are different layers and are formed separately.

The first base material layer may be a layer disposed at the outermost layer of the pouch film laminate. In this case, the first base material layer may serve to prevent moisture from being permeated from the outside of the pouch. The first base material layer may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The first base material layer may include at least one or more of polyester-based films such as polyethylene terephthalate and polybutylene terephthalate having wear resistance and heat resistance, but is not limited thereto.

As described above, the second base material layer may be a layer disposed between the first base material layer and the gas barrier layer 120. In this case, the second base material layer may serve to improve the moldability of the pouch. The second base material layer may include at least one of polyamide-based films such as nylon 6, nylon 6, 6, nylon MXD6, and nylon 4, 10, but is not limited thereto. The second base material layer may include nylon 6, and in this case, the moldability of the pouch may be improved due to the excellent stretchability of nylon 6.

Gas Barrier Layer

The gas barrier layer 120 is stacked between the base material layer 110 and the sealant layer 130 to secure mechanical strength of the pouch, block introduction and discharge of a gas or moisture outside the secondary battery, and prevent an electrolyte from leaking from the pouch-type battery case.

The gas barrier layer 120 according to the present disclosure includes stainless steel. Specifically, the gas barrier layer 120 may be manufactured by forming and/or processing a stainless steel thin film. The gas barrier layer 120 made of stainless steel may have relatively low thermal conductivity to effectively prevent or delay heat diffusion to other cells in case of the thermal runaway and may have relatively high toughness to suppress an occurrence of cracks of the pouch during use of the pouch-type battery. When stainless steel is contained in the gas barrier layer, the moldability of the pouch film laminate can be limited, but as described below, in the present disclosure, a relationship between the rupture energy in the MD and TD directions of the gas barrier layer may be adjusted to a specific level to implement a pouch film having improved durability at a high temperature and a high pressure as well as improved moldability.

The stainless steel may include at least one material selected from the group consisting of a metal element other than iron (Fe), for example, copper (Cu), chromium (Cr), manganese (Mn), nickel (Ni), magnesium (Mg), silicon (Si), and zinc (Zn).

It should be understood that any stainless steel standard and type can be used as long as the difference in rupture energy in Equation 1 is controlled to 2000 J or less. For example, the SUS grade of the stainless steel may be at least one of SUS304, SUS304L, SUS304I, and SUS316L, and specifically, at least one of SUS304I and SUS316L.

In the pouch film laminate of the present disclosure, a difference in rupture energy according to Equation 1 below may be about 2,000 J or less, specifically about 2,000 J or less, more specifically about 1,950 J or less, and more specifically about 800 J or less. A lower limit of the rupture energy difference according to Equation 1 below is not particularly limited, and for example, the difference in rupture energy according to Equation 1 below may be about 150 J or more, specifically about 200 J or more. Here, the rupture energy means the total energy that is capable of being absorbed until the specimen is ruptured when a specimen is pulled in one direction. When the difference between the rupture energy in the MD direction and the rupture energy in the TD direction exceeds about 2,000 J, the pouch film laminate may rupture or become susceptible to pinhole formation in the direction in which the rupture energy is relatively low.

$$\text{Rupture energy difference } (J) = |\text{rupture energy } (J) \text{ in } MD \text{ direction of gas barrier layer} - \text{rupture energy } (J) \text{ in } TD \text{ direction of gas barrier layer}| \quad \text{[Equation 1]}$$

The rupture energy of the gas barrier layer 120 in the MD direction may be about 5000 J or more, specifically about 8,000 J or more, more specifically about 10,000 J or more, and more specifically about 14, 300 J or more. An upper limit of the rupture energy of the gas barrier layer 120 in the MD direction is not particularly limited, and may be, for example, about 20,000 J or less. When the above numerical range is satisfied, the rupture energy of the gas barrier layer 120 in the TD direction may be about 5000 J or more, specifically about 8,000 J or more, more specifically about 10,000 J or more, and more specifically about 13000 J or more. An upper limit of the rupture energy of the gas barrier layer 120 in the TD direction is not particularly limited, and may be, for example, about 20,000 J or less. When the rupture energy in the MD direction or the TD direction satisfies the above numerical range, even if a certain level or more of energy is applied to the pouch film laminate during pouch molding, the pouch film laminate may not be immediately destroyed and stretched to secure the pouch moldability.

Rupture energy in the MD direction and TD direction of the gas barrier layer may be varied as required by controlling properties of the stainless steel in the gas barrier layer. For example, rolling temperature, cooling temperature, cooling time, etc. of the stainless steel can be adjusted to control rupture in the MD direction and the TD direction.

In the pouch film laminate of the present disclosure, a difference in tensile rupture elongation according to Equation 2 below may be about 10% or less, specifically about 0.2% to about 10%, more specifically about 0.4% to about 9.2%, and even more specifically about 0.4% to about 3.0%. Here, the tensile rupture elongation means a percentage (%) of a length extending until the specimen is ruptured compared to an initial length of the specimen when the specimen is pulled in one direction. When the difference between the tensile rupture elongation in the MD direction and the tensile rupture elongation in the TD direction satisfies the above numerical range, an elongation deviation in the MD and TD directions may be reduced during the pouch molding to improve the moldability of the pouch.

$$\text{Tensile rupture elongation difference } (\%) = |\text{Tensile rupture elongation } (\%) \text{ in } MD \text{ direction of gas barrier layer} - \text{tensile rupture elongation } (\%) \text{ in } TD \text{ direction of gas barrier layer}| \quad \text{[Equation 2]}$$

The tensile rupture elongation in the MD direction of the gas barrier layer 120 may be about 15% or more, specifically about 16% to about 60%, and more specifically about 17% to about 55%. In addition, the tensile rupture elongation in the TD direction of the gas barrier layer 120 may be about 15% or more, specifically about 16% to about 60%, and more specifically about 17% to about 55%. When the tensile rupture elongation in the MD direction or the TD direction satisfies the numerical range, a forming depth of the cup part may be secured by sufficiently stretching the pouch film laminate during the pouch molding.

In the pouch film laminate of the present disclosure, the tensile rupture strength difference according to Equation 3 below may be about 150 MPa or less, specifically about 140 MPa or less, more specifically about 120 MPa or less, and more specifically about 40 MPa or less. A lower limit of the tensile rupture strength difference according to Equation 3 may not be particularly limited, and may be, for example, about 10 MPa or more, specifically about 20 MPa or more according to following Equation 3. Here, the tensile rupture strength means a value obtained by dividing a maximum load applied until the specimen is ruptured by a cross-sectional area of the specimen before tension when the specimen is pulled in one direction. When the difference between the tensile rupture strength in the MD direction and the tensile rupture strength in the TD direction satisfies the above numerical range, a tensile strength deviation in the MD and TD directions may be reduced during the pouch molding to improve the moldability of the pouch.

$$\text{Tensile rupture strength difference (MPa)} = |\text{Tensile rupture strength (MPa) in } MD \text{ direction of gas barrier layer} - \text{tensile rupture strength (MPa) in } TD \text{ direction of gas barrier layer}| \quad \text{[Equation 3]}$$

The tensile rupture strength in the MD direction of the gas barrier layer 120 may be about 400 MPa or more, specifically about 400 MPa to about 1,000 MPa, and more specifically about 400 MPa to about 900 MPa. In addition, the tensile rupture strength in the TD direction of the gas barrier layer 120 may be about 400 MPa or more, specifically about 400 MPa to about 1,000 MPa, and more specifically about 400 MPa to about 900 MPa. When the tensile rupture strength in the MD direction or the TD direction satisfies the above numerical range, even when a tensile load of a certain level or more is applied to the pouch for the pouch molding, a limitation in which the pouch film laminate is ruptured, or the pinholes are generated may be prevented.

The thickness of the gas barrier layer 120 may be about 30 μm to about 100 μm, specifically about 40 μm to about 90 μm, and more specifically about 50 μm to about 80 μm. When the thickness of the gas barrier layer 120 satisfies the above range, moldability and gas barrier performance may be excellent during the molding of the cup part, and sufficient mechanical strength to withstand a pressure inside the pouch may be secured.

Since the gas barrier layer according to the present disclosure includes stainless steel, there may be little or no change in thickness of the gas barrier layer according to a process of forming or stretching the cup part of the pouch film laminate.

In the present disclosure, a percentage $R_t$ of the thickness of the gas barrier layer with respect to the thickness of the pouch film laminate, which is calculated by Equation 4 below, may be about 25% to about 40%, specifically about 30% to about 25%. When the percentage $R_t$ is within the above range, it is possible to realize the pouch film laminate having the excellent durability against the high temperatures and high pressures and the excellent moldability while sufficiently securing gas barrier performance.

$$R_t\,(\%) = (\text{thickness of gas barrier layer}/\text{thickness of pouch film laminate}) \times 100 \quad \text{[Equation 4]}$$

Sealant Layer

The sealant layer 130 is configured to completely seal the inside of the pouch-type battery case by being thermally bonded mutually at the sealing part when the pouch-type battery case accommodating the electrode assembly therein is sealed. For this, the sealant layer 130 may be made of a material having excellent thermal bonding strength.

The sealant layer 130 may be made of a material having insulation, corrosion resistance, and sealing properties. Specifically, since the sealant layer 130 may be in direct contact with the electrode assembly and/or the electrolyte inside the pouch-type battery case, the sealant layer 130 may be made of a material having insulation and corrosion resistance. In addition, since the sealant layer 130 must completely seal the inside of the pouch-type battery case and block material movement between the inside and outside, the sealant layer 130 may be made of a material having high sealing performance (e.g., excellent thermal bonding strength). To achieve the required insulation, corrosion resistance, and sealing properties, the sealant layer 130 may be made of a polymer material.

The sealant layer 130 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Preferably, it may be made of a polyolefin-based resin such as polypropylene (PP) and/or polyethylene (PE), particularly made of a polyolefin-based resin such as polypropylene (PP) and/or polyethylene (PE). In this case, polypropylene consists of unstretched polypropylene (CPP), acid modified polypropylene (PPa), polypropylene-ethylene copolymer and/or polypropylene-butylene-ethylene terpolymer.

The thickness of the sealant layer 130 may be about 30 μm to about 130 μm, specifically about 50 μm to about 120 μm, and more specifically about 70 μm to about 100 μm. When the thickness of the sealant layer satisfies the above range, the pouch film laminate exhibits excellent moldability and sealing strength of the sealing part.

The sealant layer 1 according to the present disclosure may have a single film structure made of any one material. Alternatively, the sealant layer 130 may have a composite film structure which is constituted by layers respectively made of two or more materials. Specifically, the sealant layer 130 may include a first sealant layer and a second sealant layer. In this case, the first sealant layer may be disposed adjacent to the gas barrier layer, and the second sealant layer may be disposed on the first sealant layer. The first sealant layer and the second sealant layer may be made of materials having different materials and/or physical properties. An interface may exist between the first sealant layer and the second sealant layer. This means that the first sealant layer and the second sealant layer are different layers and are formed separately.

Particularly, the first sealant layer may be made of acid-modified polypropylene (PPa) so as to secure long-term adhesion performance between the gas barrier layer and the first sealant layer. Here, acid-modified polypropylene may be maleic anhydride polypropylene (MAH PP).

The second sealant layer may be made of a material having insulation, corrosion resistance, and sealing properties. Specifically, since the second sealant layer is in direct contact with the electrode assembly 260 (FIG. 3) and/or the electrolyte inside the accommodation part 224, the second sealant layer may be made of a material having insulation and corrosion resistance. In addition, since the second sealant layer must completely seal the inside of the battery case and block material movement between the inside and outside, the second sealant layer may be made of a material having high sealing properties. To secure the insulation, the corrosion resistance, and the sealing properties, the second sealant layer may be made of one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The second sealant layer may be made of a polyolefin-based resin such as polypropylene (PP) and/or polyethylene (PE). In this case, the polypropylene may consist of unstretched polypropylene, acid modified polypropylene, polypropylene-ethylene copolymer, and/or polypropylene-butylene-ethylene terpolymer. Here, acid-modified polypropylene may be maleic anhydride polypropylene (MAH PP). Particularly, the second sealant layer may include non-stretched polypropylene (CPP) having heat sealability and high tensile strength.

The thickness of the pouch film laminate according to the present disclosure may be about 80 μm to about 300 μm, specifically about 80 μm to about 250 μm, more specifically about 100 μm to about 250 μm, more specifically about 120 μm to about 230 μm, and more specifically about 120 μm to about 190 μm. When the above numerical range is satisfied, it is possible to secure sufficient mechanical strength to withstand the pressure inside the pouch while facilitating the molding of the cup part of the pouch.

Pouch-Type Secondary Battery

A pouch-type secondary battery according to an embodiment of the present disclosure is described below.

The pouch-type secondary battery according to the present disclosure includes a pouch-type battery case in which an electrode assembly is accommodated, the pouch-type battery case includes a pouch film laminate, and the pouch film laminate includes a base material layer, a gas barrier layer, and a sealant layer, which are sequentially stacked, the gas barrier layer includes stainless steel, and a difference in rupture energy according to Equation 1 below is about 2,000 J or less.

$$\text{Rupture energy difference } (J) = |\text{rupture energy } (J) \text{ in } MD \text{ direction of gas barrier layer} - \text{rupture energy } (J) \text{ in } TD \text{ direction of gas barrier layer}| \quad \text{[Equation 1]}$$

Hereinafter, each configuration of the pouch-type secondary battery of the present disclosure will be described in more detail with reference to FIG. 3.

FIG. 3 is an exploded view of a pouch-type secondary battery 200 according to the present disclosure. As illustrated in FIG. 3, the pouch-type secondary battery 200 of the present disclosure may include a pouch-type battery case 210, an electrode assembly 260, an electrode lead 280, an insulating part 290, and an electrolyte (not shown).

Pouch-Type Battery Case

The pouch-type battery case 210 may accommodate the electrode assembly 260 therein. The pouch-type battery case 210 may be manufactured by molding the above-described pouch film laminate of the present disclosure. Since the detailed configuration and physical properties of the pouch film laminate are the same as those described above, detailed descriptions thereof will be omitted.

The pouch film laminate may be drawn, molded, and stretched by a punch or the like to manufacture the pouch-type battery case 210. As a result, the pouch-type battery case 210 may include a cup part 222 and an accommodation part 224. The accommodation part 224 may be configured to accommodate the electrode assembly via an accommodating space formed inside the cup part 222 in the form of a bag as the cup part 222 is formed.

According to an embodiment of the present disclosure, the pouch-type battery case 210 may include a first case 220 and a second case 230 as illustrated in FIG. 3. The first case 220 may include an accommodation part 224 capable of accommodating the electrode assembly 260, and the second case 230 may cover the accommodation part 224 from an upper side to prevent the electrode assembly 260 from being separated outward from the battery case 210. As illustrated in FIG. 3, one side of the first case 220 and one side of the second case 230 may be connected to each other. However, the present disclosure is not limited thereto. For example, the first case 220 and the second case 230 may be separately manufactured to be separated from each other.

According to another embodiment of the present disclosure, when molding a cup part in a pouch film laminate, two cup parts 222 and 232, which are symmetrical to each other, may be draw-molded adjacent to each other in one pouch film laminate. In this case, as illustrated in FIG. 3, the cup parts 222 and 232 may be formed in the first case 220 and the second case 230, respectively. After accommodating the electrode assembly 260 in the accommodation part 224 provided in the cup part 222 of the first case 220, a bridge part 240 formed between the two cup parts 222 and 232 may be folded so that the two cup parts 222 and 232 face each other. In this case, the cup part 232 of the second case 230 also accommodates the electrode assembly 260 from the upper side thereof. Thus, since the two cup parts 222 and 232 accommodate one electrode assembly 260, the electrode assembly 260 having a greater thickness may be accommodated when compared to a case in which one cup part 222 is provided. In addition, since the pouch-type battery case 210 is folded to form one edge of the secondary battery 200, the number of edges to be sealed may be reduced when a sealing process is performed later. Thus, the pouch-type secondary battery 200 can not only be processed with improved speed but also have reduced number of sealing processes.

The pouch-type battery case 210 may be sealed after accommodating the electrode assembly 260 so that a portion of the electrode lead 280, i.e., a terminal part is exposed. Particularly, when the electrode lead 280 is connected to the electrode tab 270 of the electrode assembly 260, and the insulating part 290 is formed on a portion of the electrode lead 280, the electrode assembly 260 may be accommodated in the accommodation part 224 provided in the cup part 222 of the first case 220, and the second case 230 may cover the accommodation part 224 from the upper side. Then, an electrolyte may be injected into the accommodation part 224, and the sealing part 250 formed on the edges of the first case 220 and the second case 230 may be sealed.

The sealing part 250 may serve to seal the accommodation part 224. Specifically, the sealing part 250 may seal the accommodation part 224 while being formed along the edge of the accommodation part 224. A sealing temperature of the sealing part 250 may be about 180° C. to about 250° C., particularly about 200° C. to about 250° C., and more particularly about 210° C. to about 240° C. When the sealing temperature satisfies the above numerical range, the pouch-type battery case 210 may secure sufficient sealing strength by thermal bonding.

According to the present disclosure, when the sealant layers of the first case 220 and the second case 230 are stacked to be in contact with each other and then are sealed for about 1.6 seconds at a temperature of about 210° C. and a pressure of about 1.2 MPa, a thickness of the sealing part 250 formed on the pouch-type battery case 210 may be about 54% to about 86%, specifically about 55% to about 85%, and more particularly about 60% to about 85% of the thickness of the sealant layer of the pouch film laminate. When the thickness of the sealant layer of the sealing part 250 compared to the thickness of the sealant layer of the pouch film laminate satisfies the above numerical range, it is possible to maintain the insulation properties while securing the sufficient sealing strength.

Electrode Assembly

The electrode assembly 260 may be inserted into the pouch-type battery case 210 and then sealed by the pouch-type battery case 210 after the electrolyte is injected.

The electrode assembly 260 may be formed by sequentially stacking a positive electrode, a separator, and a negative electrode. Particularly, the electrode assembly 260 may include two types of electrodes such as the positive electrode and the negative electrode and the separator disposed between the electrodes to insulate the electrodes from each other.

Each of the positive electrode and the negative electrode may have a structure in which active material slurry is applied to the electrode current collector having a metal foil or metal mesh shape. The slurry may be usually formed by agitating a granular active material, an auxiliary conductor, a conductive material, and a plasticizer with a solvent added. A solvent may be removed in a subsequent process.

Slurry, in which the electrode active material, the binder and/or the conductive material are mixed, may be applied to a positive electrode current collector and a negative electrode current collector to manufacture positive electrode and a negative electrode. Then, the positive electrode and the negative electrode may be stacked on both sides of a separator to manufacture an electrode assembly 260 having a predetermined shape. The types of electrode assembly 260 may include a stack type, a jelly-roll type, a stack and folding type, and the like, but is not limited thereto.

The electrode assembly 260 may include an electrode tab 270.

The electrode tab 270 may be connected to each of the positive electrode and the negative electrode of the electrode assembly 260 to protrude outward from the electrode assembly 260, thereby providing through which electrons are moved, between the inside and outside of the electrode assembly 260. The electrode current collector provided in the electrode assembly 260 may be constituted by a portion coated with the electrode active material and a distal end, on which the electrode active material is not applied, i.e., a non-coating portion. The electrode tab 270 may be provided by cutting the non-coating portion or by connecting the separate conductive member to the non-coating portion through ultrasonic welding. As illustrated in FIG. 3, the electrode tabs 270 may protrude in different directions of the electrode assembly 260, respectively, but is not limited thereto. For example, the electrode tabs 270 may protrude in various directions, for example, protrude in parallel to each other from one side in the same direction.

Electrode Lead

The electrode lead 280 may supply electricity to the outside of the secondary battery 200. The electrode lead 280 may be connected to the electrode tab 270 of the electrode assembly 260 by spot welding or the like.

The electrode lead 280 may be connected to the electrode assembly 260 and protrude out of the pouch-type battery case 210 via the sealing part 250. Specifically, one end of the electrode lead 280 may be connected to the electrode assembly 260, particularly the electrode tab 270, and the other end of the electrode lead 280 may protrude out of the pouch-type battery case 210.

The electrode leads 280 may include a positive electrode lead 282 having one end connected to the positive electrode tab 272 to extend in a direction in which the positive electrode tab 272 protrudes and a negative electrode lead 284 having one end connected to the negative electrode tab 274 to extend in a direction in which the negative electrode tab 274 protrudes. The other ends of both the positive electrode lead 282 and the negative electrode lead 284 may protrude out of the battery case 210. Thus, electricity generated in the electrode assembly 260 may be supplied to the outside. Also, since each of the positive electrode tab 272 and the negative electrode tab 274 is formed to protrude in various directions, each of the positive electrode lead 282 and the negative electrode lead 284 may extend in various directions. The positive electrode lead 282 and the negative electrode lead 284 may be made of materials different from each other. That is, the positive electrode lead 282 may be made of the same material as the positive electrode current collector, i.e., an aluminum (Al) material, and the negative electrode lead 284 may be made of the same material as the negative electrode current collector, i.e., a copper (Cu) material or a copper material coated with nickel (Ni). A portion of the electrode lead 280, which protrudes to the outside of the battery case 210, may be provided as a terminal part and electrically connected to an external terminal.

Insulating Part

The insulating part 290 may prevent the electricity generated from the electrode assembly 260 from flowing to the battery case 210 through the electrode lead 280 and may maintain the sealing of the battery case 210. For this, the insulating part 290 may be made of a non-conductive material having non-conductivity, which is not electrically conductive. In general, although an insulation tape which is easily attached to the electrode lead 280 and has a relatively thin thickness is mainly used as the insulating part 290, the present disclosure is not limited thereto. For example, any member may be used as the insulating part 14 as long as the member is capable of insulating the electrode lead 280.

The insulating part 290 may be disposed to surround a portion of an outer circumference of the electrode lead 280. Particularly, at least a portion of the electrode lead 280 may be surrounded by the insulating part 290. In this case, the insulating part 290 may be disposed between the electrode lead 280 and the pouch-type battery case 210. The insulation part 290 may be disposed to be limited within the sealing part 250, on which a first case 220 and a second case 230 of the pouch-type battery case 210 are thermally fused, so that the electrode lead 280 is bonded to the battery case 210.

Electrolyte

The pouch-type secondary battery 200 according to the present disclosure may further include an electrolyte (not shown) injected into the pouch-type battery case 210.

The electrolyte may move lithium ions generated by electrochemical reaction of the electrode during charging and discharging secondary battery 200. The electrolyte may include a non-aqueous organic electrolyte that is a mixture of a lithium salt and an organic solvent or a polymer using a polymer electrolyte. Furthermore, the electrolyte may include a sulfide-based, oxide-based, or polymer-based solid electrolyte, and the solid electrolyte may have flexibility that is easily deformed by external force.

When pressure is applied due to external force or gas generation, peeling may occur at an interface having relatively weak adhesion in the sealed battery cases 210. For example, the peeling may occur along an interface between the sealant layers that are thermally bonded to each other. However, in the case of the battery case manufactured from the pouch film laminate of the present disclosure, the thermal bonding between the sealant layers having improved flow characteristics during melting may be smoothly performed, and thus, the adhesion on the interface may be maintained high to realize excellent sealing strength.

Hereinafter, the present disclosure will be described in detail with reference to an exemplary embodiment. However, the following embodiment is merely illustrative, and the present disclosure is not limited to the following embodiment. It is obvious to those skilled in the art that various changes and modifications are possible within the scope and spirit of the present disclosure, and it is natural that these changes and modifications fall within the scope of the appended claims.

EXAMPLE AND COMPARATIVE EXAMPLE

Example 1: Manufacture of Pouch Film Laminate

A first adhesive film having a thickness of about 3 μm, a nylon film having a thickness of about 25 μm, a second adhesive film having a thickness of about 3 μm, and a polyethylene terephthalate (PET) film having a thickness of about 12 μm were sequentially stacked on one surface of the stainless steel thin film having a thickness of about 60 μm. A polypropylene (PP) film having a thickness of about 80

μm was stacked on the other surface of the stainless steel thin film. As a result, a pouch film laminate having a structure in which polypropylene film/stainless steel thin film/first adhesive film/nylon film/second adhesive film/polyethylene terephthalate film are sequentially stacked was manufactured.

Here, an SUS grade of the stainless steel provided in the stainless steel thin film was SUS304I.

Here, the polypropylene film is used for a sealant layer, the stainless steel thin film is used for a gas barrier layer, and the first adhesive film, the nylon film, the second adhesive film, and the polyethylene terephthalate film are used for a base material layer.

Example 2: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Example 2 was SUS304I.

Example 3: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Example 3 was SUS304I.

Example 4: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Example 4 was SUS304I.

Example 5: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Example 5 was SUS316L.

Comparative Example 1: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Comparative Example 1 was SUS304I.

Comparative Example 2: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Comparative Example 2 was SUS304I.

Comparative Example 3: Manufacture of Pouch Film Laminate

A pouch film laminate was manufactured in the same manner as in Example 1, except that a stainless steel thin film having different tensile and rupture properties was used.

An SUS grade of the stainless steel provided in the stainless steel thin film of Comparative Example 3 was SUS304I.

Experimental Example 1: Measurement of Mechanical Properties of Stainless Steel Thin Film The mechanical properties of the stainless steel thin film of Examples 1 to 5 and Comparative Examples 1 to 3 were measured and shown in Table 1 below.

Specifically, each of the tensile rupture strength, the tensile rupture elongation, and the rupture energy of the stainless steel thin film was measured by cutting the stainless steel thin film into a width of about 15 mm and a length of about 100 mm to prepare a specimen. Both ends of the specimen in lengthwise direction are then coupled to upper/lower jigs of a UTM. The gap between the end of the part fastened to the upper jig and the end of the part fastened to the lower jig of the UTM is 50 mm. The specimen is then pulled in a direction of about 180° at a speed of about 5 mm/min at room temperature (about 25° C.) to perform a tensile test. Results of the measurement are shown in Table 1 below.

Experimental Example 2: Evaluation of Maximum Forming Depth

A maximum forming depth of each of the pouch film laminates manufactured in Examples 1 and 5 and Comparative Examples 1 and 3 was measured. Specifically, when the pouch film laminate is cut to a width of about 266 mm and a length 5 of about 200 mm, and then cold-molded to form a cup part having a width of about 90 mm and a length of about 160 mm, the forming depth immediately before the pouch film laminate is ruptured was defined as a maximum forming depth (unit: mm). After preparing 10 pouch film laminates according to Examples 1 to 5 and Comparative Examples 1 to 3 to perform 10 an experiment for measuring the above maximum forming depth 10 times, a mean value obtained through the experiments was shown in Table 1 below.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| MD direction | Tensile rupture strength (MPa) | 622.5 | 507.3 | 788.2 | 652.6 | 580.0 | 532.1 | 576.7 | 670.3 |
| | Tensile rupture elongation (%) | 35.2 | 43.9 | 21.2 | 34.4 | 40.9 | 30.4 | 26.8 | 31.2 |
| | Rupture energy (J) | 17987 | 14358 | 15870 | 18834 | 19074 | 13233 | 12897 | 14241 |

TABLE 1-continued

| | | Example 1 | Example 2 | Example 3 | Example 4 | Example 5 | Comparative Example 1 | Comparative Example 2 | Comparative Example 3 |
|---|---|---|---|---|---|---|---|---|---|
| TD direction | Tensile rupture strength (MPa) | 585.9 | 624.3 | 832.9 | 523.3 | 1549.3 | 549.3 | 642.4 | 812.3 |
| | Tensile rupture elongation (%) | 35.8 | 52.3 | 17.1 | 48.6 | 39.0 | 38.6 | 44.9 | 20.1 |
| | Rupture energy (J) | 17346 | 13425 | 13957 | 17623 | 17501 | 17501 | 24332 | 12103 |
| Δ = \|MD − TD\| | Tensile rupture strength difference (MPa) | 36.6 | 117.0 | 44.7 | 129.3 | 30.7 | 17.2 | 65.7 | 142.0 |
| | Tensile rupture elongation difference (%) | 0.6 | 8.4 | 4.1 | 14.2 | 1.9 | 8.2 | 18.1 | 11.1 |
| | Rupture energy difference (J) | 641 | 933 | 1913 | 1211 | 1573 | 4268 | 11435 | 2138 |
| Mean value (mm) of maximum forming depth (mm) | | 8.4 | 7.7 | 7.2 | 6.6 | 7.6 | 4.6 | 3.2 | 5.2 |

According to Table 1, in the case of Examples 1 to 5 in which the difference between the rupture energy in the MD direction and the rupture energy in the TD direction in the gas barrier layer is about 2,000 J or less, the forming depth of the cup part may be greater than that in Comparative Examples 1 and 2, and thus it can be seen that the moldability of the pouch film laminate manufactured in Examples 1 to 5 is superior to that in Comparative Examples 1 to 2.

Particularly, in the case of Comparative Examples 1 to 3, the maximum forming depth may be very low compared to that in Embodiments, and in this case, since there is a limitation of increasing in number of electrode assemblies that are capable of being accommodated in the pouch film, it may be understood that it is difficult to improve the cell energy density of the secondary battery.

The pouch film laminate according to the present disclosure may include the gas barrier layer including stainless steel, and the difference between the rupture energy in the MD direction and the rupture energy in the TD direction of the gas barrier layer may be about 2000 J or less. The pouch film laminate using the gas barrier layer, which satisfies the above conditions, may have excellent durability at the high temperature and the high pressure, and simultaneously, have the significantly improved moldability of the pouch film laminate to secure the sufficient forming depth.

While the present disclosure has been shown and described in connection with the exemplary embodiments, it will be apparent to those skilled in the art that modifications and variations can be made without departing from the spirit and scope of the disclosure as defined by the appended claims.

What is claimed is:

1. A pouch film laminate comprising:

a base material layer, a gas barrier layer, and a sealant layer, the gas barrier layer including stainless steel and being disposed between the base material layer and the sealant layer, wherein a difference between a rupture energy measured along a machine direction (MD) of the gas barrier layer and a rupture energy measured along a transverse direction (TD) of the gas barrier layer ranges from 150 J to 2000 J, the machine direction extending parallel to a rolling direction during manufacture of the gas barrier layer and the transverse direction being transverse to the machine direction, wherein the rupture energy of the gas barrier layer in the machine direction is about 14,300 J or more, and the rupture energy of the gas barrier layer in the transverse direction is about 13,000 J or more.

2. The pouch film laminate of claim 1, wherein a difference between a tensile rupture elongation along the machine direction of the gas barrier layer and a tensile rupture elongation along the transverse direction of the gas barrier layer is 10% or less.

3. The pouch film laminate of claim 1, wherein a tensile rupture elongation length of the gas barrier layer in the machine direction is 15% or more than an original length of the gas barrier layer in the machine direction, and a tensile rupture elongation length of the gas barrier layer in the transverse direction is 15% or more than an original length of the gas barrier layer in the transverse direction.

4. The pouch film laminate of claim 1, wherein a difference between a tensile rupture strength of the gas barrier layer in the machine direction and a tensile rupture strength of the gas barrier layer in the transverse direction of the gas barrier layer is 150 MPa or less.

5. The pouch film laminate of claim 1, wherein a tensile rupture strength of the gas barrier layer in the machine direction is 400 MPa or more, and a tensile rupture strength of the gas barrier layer in the transverse direction is 400 MPa or more.

6. The pouch film laminate of claim 1, wherein a thickness of the gas barrier layer is 10% to 50% of a thickness of the pouch film laminate.

7. The pouch film laminate of claim 1, wherein the gas barrier layer has a thickness of 30 μm to 100 μm.

8. The pouch film laminate of claim 1, wherein the pouch film laminate has a thickness of 80 μm to 300 μm.

9. A pouch-type secondary battery comprising:

a pouch-type battery case in which an electrode assembly is accommodated, the pouch-type secondary battery comprising:

a pouch film laminate, the pouch film laminate having a base material layer, a gas barrier layer, and a sealant layer, the gas barrier layer including stainless steel and being disposed between the base material layer and the sealant layer, wherein a difference between a rupture energy measured along a machine direction (MD) of the gas barrier layer and a rupture energy measured along a transverse direction (TD) of the gas barrier layer ranges from 150 J to 2000 J, the machine direction extending parallel to a rolling direction during manufacture of the gas barrier layer and the transverse direction being transverse to the machine direction, wherein the rupture energy of the gas barrier layer in the machine direction is about 14,300 J or more, and the rupture energy of the gas barrier layer in the transverse direction is about 13,000 J or more.

10. The pouch-type secondary battery of claim 9, wherein a difference between a tensile rupture elongation along the machine direction of the gas barrier layer and a tensile rupture elongation along the transverse direction of the gas barrier layer is 10% or less.

11. The pouch-type secondary battery of claim 9, wherein a tensile rupture elongation length of the gas barrier layer in the machine direction is 15% or more than an original length of the gas barrier layer in the machine direction, and a tensile rupture elongation length of the gas barrier layer in the transverse direction is 15% or more than an original length of the gas barrier layer in the transverse direction.

12. The pouch-type secondary battery of claim 9, wherein a difference between a tensile rupture strength of the gas barrier layer in the machine direction and a tensile rupture strength of the gas barrier layer in the transverse direction of the gas barrier layer is 150 MPa or less.

13. The pouch-type secondary battery of claim 9, wherein a tensile rupture strength of the gas barrier layer in the machine direction is 400 MPa or more, and a tensile rupture strength of the gas barrier layer in the transverse direction is 400 MPa or more.

14. The pouch-type secondary battery of claim 9, wherein a thickness of the gas barrier layer is 10% to 50% of a thickness of the pouch film laminate.

15. The pouch-type secondary battery of claim 9, wherein the gas barrier layer has a thickness of 30 μm to 100 μm.

16. A method for manufacturing a pouch-type secondary battery, the method comprising the steps of:

providing a pouch film laminate with a base material layer, a gas barrier layer and a sealant layer, the gas barrier layer being disposed between the base material layer and the sealant layer;

measuring a first rupture energy of the gas barrier layer along a first direction of the gas barrier layer;

measuring a second rupture energy of the gas barrier layer along a second direction of the gas barrier layer, the second direction being transverse to the first direction;

determining that a difference between the first rupture energy and the second rupture energy is less than a predetermined threshold, and shaping the pouch film laminate to accommodate a secondary battery to form a pouch-type secondary battery, wherein the first rupture energy of the gas barrier layer in the first direction is about 14,300 J or more, and the second rupture energy of the gas barrier layer in the second direction is about 13,000 J or more, wherein the first direction is a machine direction extending parallel to a rolling direction during manufacture of the gas barrier layer, wherein the predetermined threshold ranges from 150 J to 2000 J, wherein the gas barrier layer includes stainless steel.

* * * * *